United States Patent Office 2,879,175
Patented Mar. 24, 1959

2,879,175

METHOD FOR PRODUCING A SILVER COATING ON A NON METALLIC MATERIAL

Elmar Johannes Umblia, Hagersten, and Ernst Åke Lennart Schulze, Bromma, Sweden, assignors to Telefonaktiebolaget L M Ericsson, Stockholm, Sweden, a corporation of Sweden No Drawing. Application October 20, 1954
Serial No. 463,601

Claims priority, application Sweden October 23, 1953

7 Claims. (Cl. 117—35)

The present invention refers to an improved method for producing silver coatings on non metallic materials by chemical deposition of silver from a solution, containing silver ions. Such a silver coating on an electrically non-conducting material, as glass, ceramic, mica, plastics, wax etc. can be used either directly for electrotechnical purposes or as a conductive ground coating for the subsequent production of a thicker metal layer by metal plating. This method can also be used for producing reflecting silver coatings, for instance silver mirrors on transparent, non metallic materials as glass and plastics. Further such a silver coating can be produced on a non metallic material for decorative purposes.

According to previously known chemical deposition methods a silver coating mainly is obtained in the following manner. The work, which is to be silvered, is carefully cleaned from dirt, fat and other impurities and is activated by treatment with a solution, containing divalent tin ions eventually followed by a treatment with silver nitrate solution. After this the cleaned and activated work is dipped in a solution, containing complex silver-ammonia ions, for instance ammoniacal silver nitrate solution, and a reducing agent, for instance invert sugar, Rochelle salt, formalin etc. This method has, however, the disadvantage that only a little part of the silver can be utilized as silver coating on the work which is to be silvered. The incomparably greatest part of the silver is deposited in the silvering solution and on the walls of the silvering vessel. Such a silvering method is therefore wasteful and furthermore only a very thin silver coating can be obtained by silvering the work only once.

It is however found that, if pyridine and cetyl pyridinium bromide are added to the ammoniacal silver salt solution, the silver deposition can be inhibited as well in the silvering solution as on the vessel walls, while on a work activated by treatment with stannous chloride solution and silver nitrate solution a silver coating is formed, the thickness of which to a certain degree increases with the silvering time. As the silver deposition from such a solution takes place selectively, i.e. only on an activated work, the greatest part of the silver can be utilized for silvering of the work, and therefore the silvering method is economic. Furthermore the thickness of the silver coating can be regulated by means of the silvering time. This silvering method has, however, a great disadvantage in the fact that the silver coating will be rather coarse-crystalline and porous and also adheres badly at the base. These disadvantages are mainly caused by the fact that the inhibition of the silver deposition in the silvering solution and on non activated surfaces is accomplished in an unsuitable manner.

The main object of the present invention is to obtain a selective and adjustable chemical silvering method, which gives dense and fine grained silver coatings with good adhesion.

Another object of the invention is to accomplish the selectivity of the silver deposition process and its adjustment mainly by proper concentration rates of the reaction components, i.e. of the silver ions, the reducing agent and the hydroxyl ions, in order to make the process independent from any empirical composition of the silvering solution.

Another object of the invention is to improve the characteristics of the silver coating by activating the work, which is to be silvered, in a special manner whilst at the same time as any contamination of the silvering solution is most securely eliminated and its useful life is prolonged.

Another more special object of the invention is to obtain a simplified method for silvering of only certain parts of a non metallic base according to a certain pattern.

The fundamental principle of the invention for producing dense and fine grained silver coatings with good adhesion by selective and adjustable chemical silver deposition arises from the discovery that the above mentioned characteristics of the silver coating depend both on the rate by which the silver deposition takes place, and how the base has been activated, i.e. how the activating centres have been placed on the base. At a too strong inhibition the silver deposition rate is so low, that the silver coating will be coarse grained and loose and furthermore it will be contaminated by non compatible substances which are built into the silver coating. If on the other side silver is deposited with such a high rate, that all deposited silver cannot be built into the coating, the selectivity of the deposition process is imperiled by the fact that loose silver particles, which have not been built into the coating, will start silver deposition in the silvering solution. The proper adjustment of the silver deposition rate is therefore of great importance.

A development of the invention referring to the possibility to make the silver deposition process independent of certain empirical and most often unsuitable compositions of the silvering solution, is based on the fact, that the concentrations of the reaction components, i.e. the silver ions, the reducing agent and the hydroxyl ions, are chosen just below these limits, at which the silver deposition would be started also in the silvering solution. The silver deposition from such a solution on an activated work is obtained owing to the fact that the activating centres of the work will catalyse the silver deposition. As the silvering solution must contain a quantity of silver, sufficient for practical use, and at the same time the silver ion concentration must be rather low, the silver must be transferred in a complex compound, soluble in water, which gives the proper silver ion concentration. Suitable complex forming substances are found among organic bases, principally amines. As however, the silver deposition rate according to the invention will be properly adjusted by the hydroxyl ion concentration, the complex forming substance must also give a hydroxyl ion concentration lower than $10^{-3}$ gram-ion/l. For the same reason only such reducing agent is to be used, which is effective only in alkaline solution.

The silver deposition rate can be adjusted by admixture of ionogenic substances which will form difficultly soluble compounds with silver, principally halides. In the cases, when the silver deposition in the silvering solution and on non activated surfaces cannot completely be inhibited by means of the concentrations of the reaction components, the inhibition can, however, be obtained by admixture of the above-mentioned substances in water soluble form.

Another modification of the invention referring to the improvement of the characteristics of the silver coating by a special activating method of the work, which is to be silvered, arises from the discovery that a more fine grained silver coating with improved adhesion is obtained, if the base has been treated with stannous chloride solution and silver salt solution so that activating centres are placed on the ground in the form of closely together lying microscopic silver crystals or preferably in the form of continuous, very thin silver coating. For this purpose the work treated with stannous chloride is thereafter to be treated with a very diluted silver salt solution or ammoniacal silver salt solution or preferably with a diluted silvering solution, containing for instance silver-ammonia-hydroxide and invert sugar. The thickness of the silver coating, which is obtained by treatment with the last mentioned silvering solution, can also be adjusted by admixture of ionogenic substances, which will form difficultly soluble compounds with silver, preferably halides. By applying activating centres as a thin, continuous silver coating the useful life of the silvering solution is prolonged owing to the fact that the very thin silver coating protects the solution against contaminations by metal ions and silver particles, which otherwise would possibly get loose from the surface of the work. Furthermore it is possible by means of a mask to activate only certain parts of the base. As the silver deposition takes place on these activated parts, a silver coating according to the mask pattern is obtained.

The procedure when producing silver coating on a non metallic work, involves the following three operations: (1) Cleaning, (2) activating and (3) silvering.

*Cleaning.*—The work, which is to be silvered, must first be cleaned from dust, dirt and fat, for instance by washing in warm trisodium phosphate solution and then rinsing with water.

*Activating.*—The cleaned work is first treated about one minute with at most one percent stannous chloride or sodium stannite solution and is rinsed thoroughly with distilled water. Thereafter the activating is completed by treatment with diluted water solution of a common silver salt, such as silver nitrate or an ammoniacal silver salt solution or most preferably with a diluted silvering solution, and after this the activated work is rinsed thoroughly with distilled water. The common silver salt solution must contain not more than 1 gram silver/l. The ammoniacal silver salt solution is made by dissolving of so much silver salt in water, that the content of silver is at most one gram/l., and then so much ammonia is added that the first formed silver hydroxide deposition is just dissolved. The silvering solution for activating purposes is made by mixing equal parts of the following part-solutions:

0.15–1.5 g. silver nitrate/l.
0.25–2.5 ml. concentrated ammonia/l.
0.12–1.25 g. invert sugar/l.

The silvering solution can if needed be saturated with about 0.01% solution of a water soluble halide. These substances ought suitably be added before the invert sugar solution.

*Silvering.*—The activated and yet wet work is dipped in the silvering solution, where it may hang up til about 30 minutes, dependent on the fact how thick silver coating is wanted. At longer silvering time the adherence of the silver coating is decreased considerably. The silvered work is rinsed thoroughly with water and is dried. If the formulation of the silvering solution is correct, the silver deposition takes place only on the activated work and not in the solution or on any non activated surfaces. The same solution can be used for silvering of more works one after another.

The silvering solution must—as a rule—contain the following components: (1) a silver salt soluble in water, for instance silver nitrate, (2) a suitable complex forming compound, preferably as organic amine, (3) a reducing agent, effective only in alkaline solution and (4) an alkaline substance, such as ammonia or alkali-metal-hydroxide, by which the hydroxyl ion concentration of the solution can be adjusted. All these substances must be taken in such proportions, that the silver deposition takes place only on the activated work. A suitable complex forming substance shall be able to form with the silver ions such a strong complex compound that the silver ion concentration of the solution does not exceed $10^{-6}$ gramion/l. At the same time the hydroxyl ion concentration does not exceed $10^{-3}$ gramion/l. When these conditions are fulfilled, no silver deposition will take place, when the reducing agent is added, not even on the activated work. The silver deposition is first started by increasing the hydroxyl ion concentration to a value of more than $10^{-3}$ gramion/l., by addition of a suitable quantity of ammonia or alkaline hydroxide to the solution. The silver deposition rate can be increased by increasing the hydroxyl ion concentration. The deposition rate can be decreased by adding of certain ionogenic substances, which are able to form difficultly soluble compounds with silver, preferably halides.

Suitable silvering solution may have the below mentioned formuations:

*Example 1*

25 ml. silver nitrate solution _____ 30 g. AgNO$_3$/l.
15 ml. pyridine _____ 98–100 percent.
0.10 ml. potassium hydroxide solution _ 0.5 KOH/l.
0–10 ml. potassium bromide solution __ 30 mg. KBr/l.
20 ml. formaldehyde _____ 40 percent.
Distilled water to 100 ml.

*Example 2*

25 ml. silver nitrate solution _____ 30 g. AgNO$_3$/l.
0–20 ml. ammonia solution _____ 6.5 g. H$_3$N/l.
10–30 ml. pyridine _____ 98–100 percent.
10–30 ml. hydrazine sulphate
 solution _____ 20 g. (NH$_2$)$_2$H$_2$SO$_4$/l.
0–10 ml. potassium bromide solution ___ 30 mg. KBr/l.
Distilled water to 100 ml.

*Example 3*

25 ml. silver nitrate solution _____ 30 g. AgNO$_3$/l.
0–20 ml. ammonia solution _____ 6.5 g. H$_3$N/l.
10–30 ml. β-picoline
10–30 ml. hydrazine sulphate
 solution _____ 20 g. (NH$_2$)$_2$H$_2$SO$_4$/l.
0–10 ml. potassium bromide solution ___ 30 mg. KBr/l.
Distilled water to 100 ml.

*Example 4*

25 ml. silver nitrate solution _____ 30 mg. AgNO$_3$/l.
0–20 ml. ammonia solution _____ 6.5 g. H$_3$N/l.
10–30 γ-picoline
10–30 ml. hydrazine sulphate
 solution _____ 20 g. (NH$_2$)$_2$H$_2$SO$_4$/l.
0–10 ml. potassium bromide solution ___ 30 mg. KBr/l.
Distilled water to 100 ml.

We claim:

1. A method of coating a non-metallic surface with a film of metallic silver which comprises: activating said surface first with a solution containing divalent tin ions and secondly with a solution containing silver ions; followed by exposing the thus-activated surface to a silvering solution containing a complex silver compound wherein the concentration of the silver ions does not exceed $10^{-6}$ gramions/l., hydroxyl ions in a concentration that does not exceed $10^{-3}$ gramions/l., a reducing agent active only in alkaline solution; and then adding to the said silvering solution an alkaline substance to increase the hydroxyl ion concentration in the silvering solution to exceed $10^{-3}$ gramions/l., whereby silver from said silvering solution is deposited selectively on the said activated surface.

2. A method of coating a non-metallic surface with a film of metallic silver which comprises: activating said surface first with a solution containing divalent tin ions and secondly, with a solution containing silver ions; followed by immersion of the thus-activated surface in a silvering solution containing a complex silver compound in which the concentration of the silver ions does not exceed $10^{-6}$ gramions/l., hydroxyl ions in a concentration that does not exceed $10^{-3}$ gramions/l. and a reducing agent active only in an alkaline solution; and then starting the deposition of silver metal on the surface by adding to said silvering solution an alkaline substance to increase the hydroxyl ion concentration therein to exceed $10^{-3}$ gramions/l., whereby silver from said silvering solution is deposited selectively on the said activated surface.

3. A method in accordance with claim 1 wherein the activation of the non-metallic surface is carried out first by treatment with a solution of a stannous compound in a concentration not exceeding 1 percent and secondly, with a common silver salt solution containing at most 1 gram of silver per l.

4. A method in accordance with claim 1 in which the activation of a non-metallic surface is carried out first by treatment with a solution of stannous chloride in a concentration not exceeding 1 percent and secondly with an ammoniacal silver salt solution containing at most 1 gram of silver/l.

5. A method in accordance with claim 1 in which the activation of the non-metallic surface is carried out first by treatment with a solution of a stannous compound in a concentration not exceeding 1 percent and secondly, with a solution containing equal parts of the following solutions:

0.15 to 1.5 grams of silver nitrate/l.
0.25 to 2.5 ml. of concentrated ammonia/l.
0.12 to 1.25 grams of invert sugar/l.

6. Method in accordance with claim 1 wherein the silvering solution contains a water-soluble pyridine.

7. Method in accordance with claim 1 wherein areas of the surface which are not to be silvered, are protected by a mask during the activation.

References Cited in the file of this patent

UNITED STATES PATENTS

| | | |
|---|---|---|
| 354,343 | Pratt | Dec. 14, 1886 |
| 1,324,690 | Permuy | Dec. 9, 1919 |
| 2,303,871 | Walker | Dec. 1, 1942 |
| 2,315,141 | Tryon | Mar. 30, 1943 |
| 2,363,354 | Peacock | Nov. 21, 1944 |
| 2,602,757 | Kantrowitz et al. | July 8, 1952 |
| 2,762,714 | Smith et al. | Sept. 11, 1956 |